United States Patent
Nowlin, Jr.

[11] Patent Number: 5,953,536
[45] Date of Patent: Sep. 14, 1999

[54] SOFTWARE-IMPLEMENTED TOOL FOR MONITORING POWER MANAGEMENT IN A COMPUTER SYSTEM

[75] Inventor: Dan Howard Nowlin, Jr., Hillsboro, Oreg.

[73] Assignee: Intel Corporation, Santa Clara, Calif.

[21] Appl. No.: 08/723,744

[22] Filed: Sep. 30, 1996

[51] Int. Cl.$^6$ .................................................. G06F 1/32
[52] U.S. Cl. .............................. 395/750.05; 395/750.03; 364/707
[58] Field of Search ..................... 395/750.01, 750.04, 395/750.05, 750.03; 364/707

[56] References Cited

U.S. PATENT DOCUMENTS

| | | | |
|---|---|---|---|
| 4,623,988 | 11/1986 | Paulson et al. | 395/184.01 |
| 5,167,024 | 11/1992 | Smith et al. | 395/750.04 |
| 5,396,635 | 3/1995 | Fung | 395/750.05 |
| 5,504,910 | 4/1996 | Wisor et al. | 395/750.04 |
| 5,560,024 | 9/1996 | Harper et al. | 395/750.04 |
| 5,590,342 | 12/1996 | Marisetty | 395/750.06 |
| 5,623,677 | 4/1997 | Townsley et al. | 395/750.02 |
| 5,640,574 | 6/1997 | Kawashima | 395/750.08 |
| 5,664,202 | 9/1997 | Chen et al. | 395/750.08 |
| 5,758,172 | 5/1998 | Seo | 395/750.01 |

*Primary Examiner*—Gopal C. Ray
*Attorney, Agent, or Firm*—Kenyon & Kenyon

[57] ABSTRACT

A software-implemented tool for monitoring CPU power usage in a personal computer system, especially well-suited for use in battery-powered computers running a Windows® operating system, includes a virtual device driver for causing the computer system's processor to enter a low-power state when software running on the computer system is idle. A monitor routine is in communication with the virtual device driver for gathering and storing information relating to a condition of the computer system while the processor is in its low-power state. A user interface routine is also provided to facilitate displaying this information to a system user.

18 Claims, 3 Drawing Sheets

SOFTWARE-IMPLEMENTED TOOL FOR MONITORING POWER MANAGEMENT IN A COMPUTER SYSTEM

BACKGROUND OF THE INVENTION

The present invention relates generally to the field of computer resource management, and in particular to a CPU power monitor for use in analyzing the power efficiency of software running on a computer. The invention is particularly well-suited for monitoring CPU power management in battery-powered, mobile personal computer systems (i.e., notebook or laptop PCs).

Designers of mobile PCs are faced with two apparently-conflicting user requirements: desktop PC equivalence and long battery life. To help meet these requirements, system designers go to great lengths to maximize the power conservation capabilities of mobile computers. Practically every device in these systems has some level of power management capability, including hard disk drives, displays and communication ports.

Historically, the central processing unit (CPU) has been a key contributor to power consumption and heat generation in mobile computers. Chip manufacturers, such as Intel Corporation, have therefore incorporated power management features into their CPUs, such as "stop clock" and "halt" states. This technology allows a tradeoff between high performance and power/heat conservation. For example, a Pentium®90 processor running the Windows®95 operating system draws approximately 6–7 watts when operating at full capacity; however, when Windows®95 is idle and the CPU is primarily in a halt state, consumption drops to just 1 watt.

Unfortunately, even with the sophisticated power management techniques now employed, higher processor speeds and state-of-the-art hardware such as Advanced Graphics Ports and DVD drives will likely cause mobile PCs to reach their maximum thermal dissipation limit (i.e., approximately 20 watts) within the next few years. To make matters worse, battery technology has tended to improve at a much slower rate than the increasing power requirements of mobile PCs, resulting in shortened battery life. Additional ways of conserving power must therefore be found to help combat these trends.

To date, efforts at improving PC power management have virtually ignored software; however, software may be the simplest area in which to gain back "wasted" watts and reduce system heat. Software is indirectly a power consumer by keeping hardware, most notably the CPU, busy. Indeed, poorly-written software can actually waste several watts while providing the user with no tangible benefit. Well-behaved software conserves power by minimizing CPU utilization without any user-perceptible degradation in performance.

In a Windows®95 environment, for example, a primary way in which power-wise software reduces unnecessary CPU use is by avoiding polling loops while waiting for user input, hardware events or software semaphores. Well-behaved software gives up control to the operating system during these times, and only periodically examines the state of the device, event or semaphore of interest. As a general rule, an application should draw more than minimal power only when providing some user-perceptible benefit (e.g., recalculating a spreadsheet, repaginating a word processing document, displaying an MPEG movie).

Unfortunately, many of today's popular software titles have been found to be power-wasting applications. This has a significant impact on system power consumption, since just one errant application will spoil the system's ability to perform power management. Moreover, computer users cannot readily detect power-wasting applications. Unbeknownst to system users, their favorite applications may be depleting their batteries unnecessarily, severely limiting run time.

A properly architected, power-friendly application should not adversely impact performance on either a desktop PC or a mobile system. From a development standpoint, it does not take much more effort to create a power-friendly application than one that wastes power, but the resulting power savings and reduction in heat generation can be substantial. Using a single, well-designed product for both environments will result in quality applications that run well on all systems.

The CPU power monitor of the present invention is intended to encourage and assist software developers to create software that is both effective and mobile PC-friendly. Using this invention, software vendors can test software on both desktops and mobile computers to ensure they deliver an efficient and power-friendly product.

The present invention is primarily, but not exclusively, directed to a Windows®95 operating environment. It is thus beneficial to understand how Windows®95 currently handles power management in order to better appreciate the benefits and advantages of the present invention.

Power management in the Windows®95 environment is done cooperatively between three layers of software, as shown in FIG. 2. At the bottom-most software level is the APM (Advanced Power Management) BIOS, which controls power to the various system hardware components (e.g., hard disk, chipset, CPU). Just above the BIOS level is the Windows®95 operating system itself. At the top of the software stack are the various applications running on the system.

The APM BIOS provides a system-independent interface for performing power management on computer systems-employing an Intel® Architecture. The specific way in which computer systems handle APM calls will vary among system implementations. For example, the APM BIOS may handle certain built-in devices such as the video monitor differently from platform to platform. The APM BIOS specification intentionally avoids defining how to perform power management at the device level, in favor of abstractly allowing a power driver to request various device-directed power activities.

Among the APM BIOS' specified functions is the CPU__ Idle API (Application Program Interface) call, which allows the CPU to be placed into a low-power state. The APM BIOS normally does this by executing an HLT instruction, which turns off some of the internal circuitry of the CPU until the next external interrupt. On an idle Windows®95 system, the HLT instruction is executed about once every 13.7 ms and the CPU remains in a low-power state approximately 98% of the time.

While executing HLT is the usual method for saving processor power, several CPU chipsets provide support for other power-saving mechanisms, such as "Stop Clock." The APM BIOS specification allows the BIOS vendor to tailor functionality to a particular platform.

The Windows®95 power driver, "VPOWERD.VXD," supplies a means of communication between the APM BIOS and the operating system. This power driver is integrated into the core VMM.VxD driver. VPOWERD exports several APIs which give the operating system access to the power-saving features of the APM BIOS, including the abovementioned CPU_Idle call. Whenever Windows®95 detects that all loaded software, drivers, and the operating system itself are idle, Windows®95 makes a CPU_Idle call via VPOWERD. By this call, the operating system is said to be in the idle state and has given control to the APM BIOS to save power.

Applications usually do not participate directly in power management activities, although methods do exist within Windows®95 by which software may play a more active role in that regard. Applications can nevertheless have a significant impact on the operating system's ability to enter the idle state, because the operating system cannot enter that state until all loaded software is idle.

For an application to enter the idle state, it must voluntarily give control back to the operating system. This is normally done by calling a Windows® blocking API, such as GetMessage or WaitMessage. Calls to these APIs tell the operating system to return only when the application has more messages or events to process. On the other hand, there are certain Windows® APIs that do not enter this blocking state, such as PeekMessage. Such APIs return to the calling application immediately whether or not there is a message waiting. Under these circumstances, Windows®95 believes that the application has more processing to do and will not enter the idle state. This allows the application to have full use of the CPU until the application calls one of the blocking APIs or is preempted by the operating system.

Once all applications have entered their idle state, Windows®95 gives the virtual device drivers (VxD) in the system the opportunity to perform any necessary idle processing. To provide this opportunity, the VMM (Virtual Machine Manager) driver will call a list of pre-registered VxD idle callback addresses, know as the "idle callback chain." If a VxD wants to prevent the system from idling, it returns from the idle callback with its carry flag clear. This act of preventing idle is called "consuming idle" or "eating idle." If, on the other hand, the VxD returns with its carry flag set, the operating system knows that, at least as far as that particular VxD is concerned, it is permissible for the system to enter the idle state. When all the VxDs in the idle callback chain are idle (i.e., return with carry flag set), VPOWERD calls the CPU_Idle APM BIOS function to conserve power.

It is important to note that under certain operating systems, most notably Windows®95, one individual application or VxD has the ability to contravene attempts by all the other applications and drivers to facilitate power management. In other words, a single application that blocks power management activity will sabotage power management for the entire system. While all other applications may be waiting for an input or an event, the single non-idle application will be scheduled to run. The operating system will only enter the idle state when all applications and VxDs are idle.

In view of the dramatic negative impact even one poorly-written application can have on a system's power management efficiency, a significant purpose of the CPU power monitor according to the present invention is to determine when software is preventing the system from entering an idle state and, more specifically, to determine which application is causing the problem.

SUMMARY OF THE INVENTION

The present invention provides a software-implemented tool for monitoring CPU power usage in a personal computer system, and is especially well-suited for application in battery-powered mobile computers running a Windows® operating system. Using this CPU power monitor, users are able to determine when excessive CPU power is being drawn, as well as identify the offending application. The CPU power monitor can also be used to test the "power-friendliness" of specific software applications running on the computer system. Finally, in some instances, the CPU power monitor can apply a temporary fix to an ill-behaved application to demonstrate that CPU power management and performance are compatible.

In a first embodiment of the invention, directed primarily to a Windows®-based system equipped with an APM BIOS, the CPU power monitor includes a power monitor VxD that is installed as an intermediary between the Windows® VPOWERD device driver and the APM BIOS. This is accomplished by hooking the power monitor VxD into the VMM idle callback chain such that the power monitor VxD is the first device driver to request an idle callback, and thus the last device driver to receive an idle callback. When the operating system determines that all loaded applications are in an idle state (e.g., waiting for keyboard input, waiting for a mouse event, waiting for a message), VMM begins sequentially processing the idle callback chain, sending an idle callback to each device driver that had requested to be informed of an idle state. Each device driver then has the opportunity to perform desired idle-time processing. The position of the power monitor VxD as the last device driver in the idle callback chain means that receipt of an idle callback from the VMM can be interpreted as indicating that all other device drivers have completed their idle-time processing. The power monitor VxD can thus initiate power management.

To initiate power management, the power monitor VxD makes an APM CPU_Idle call to the APM BIOS routine, just as VPOWERD would have in the absence of the power monitor VxD. By having the power monitor VxD make this call, however, there is an opportunity to monitor and record information about the APM BIOS' power management activities. When the APM BIOS receives the CPU_Idle call, its basic processing consists of executing an HLT command to place the CPU into a low-power state. The CPU remains in this state until the occurrence of an external interrupt, which causes control to return to the APM BIOS. The APM BIOS in turn returns to the power monitor VxD, which again has an opportunity to monitor and record information about the APM BIOS' power management activities.

The CPU power monitor of the present invention may also be advantageously applied in systems that are not equipped with APM BIOS. Without APM BIOS, Windows® is unable to call the CPU_Idle function after processing of the idle callback chain, meaning no power management is performed. According to this embodiment of the present invention, however, the power monitor VxD may be hooked into the idle callback chain in a manner similar to when the APM BIOS is present. Here, the power monitor VxD is again configured as the first device driver to request an idle callback, and thus the last device driver to receive an idle callback. Upon receipt of the idle callback, rather than invoking the APM BIOS with a CPU_Idle call, the power monitor VxD instead executes a CPU HLT command. As in the earlier embodiment, this call causes the CPU to enter a low-power state. Upon occurrence of an external interrupt, control will return to the power monitor VxD. Once again, this embodiment permits the power monitor VxD to monitor and record information about CPU power management both before and after the HLT command issues.

The CPU power monitor according to the present invention preferably includes a graphical user interface for displaying power management information to a user. For example, the CPU power monitor may maintain a dialog box which presents a bar graph showing the percentage of time that the system is spending in a non-idle state, as well as the most active application. A high non-idle percentage indicates that some application is inhibiting the system from idling, and thus preventing the system from taking steps to save power. The "most active application" display points the user to the most likely offender.

To generate the non-idle time percentage display, the power monitor VxD may keep a record of how much time the system spends in an idle state over a sample period. Each time the power monitor VxD initiates power management, either by calling the APM CPU_Idle function or by calling CPU HLT, it determines how much time elapses between the call and the return (indicating that an external interrupt "woke" the system). This time is added to a running total for the sample period which can then be used to calculate the idle time percentage.

As noted above, an advantageous feature of the present invention is the ability to identify particular software that is preventing the system from entering an idle state. The power monitor VxD may be configured to detect both application software and device drivers that are blocking the idle. To monitor applications, the power monitor VxD uses the VMM service GetCurrentProcessHandle upon return from its power management call (i.e., APM CPU_Idle or HLT) to identify the currently-running application. To identify an offending device driver, the power monitor VxD may be configured to take over the VMM's task of processing the idle callback chain. This allows the power monitor VxD to identify which device driver is terminating the idle callback. When the system is not idle and one particular device driver is repeatedly identified as consuming the idle, this is a strong indication that the device driver is inhibiting power management.

In another embodiment of the present invention, the CPU power monitor may be configured to temporarily fix power-wasting software. Fixes can be made when, for example, the power monitor VxD identifies the root cause of the non-idle problem as either the improper use of the PeekMessage API or an idle-eating device driver. For PeekMessage fixes, the power monitor VxD globally hooks the Win32 PeekMessage API to facilitate identifying when software is in a PeekMessage loop. The power monitor VxD also maintains a table of process IDs that have called PeekMessage, along with the frequency of those calls. The CPU power monitor will then provide the user with the option of "fixing" an offending application when it detects that (1) the system is non-idle; (2) a process has called PeekMessage more than a predetermined threshold number of times; and (3) the current non-idle process matches the process that called PeekMessage. If the user elects to fix the offending software, the CPU power monitor calls MsgWaitForMultipleObjects (a blocking Win32 API) to force the offending process to suspend for a short period of time. While the offending software still thinks it is using a non-blocking PeekMessage call, from the operating system's perspective a blocking call has been made and power management may take place. For device driver fixes, when the CPU power monitor determines that a previously-identified "idle-eater" VxD has terminated the idle callback chain it immediately initiates power management, either by calling APM CPU_Idle or by issuing a CPU HLT command.

DETAILED DESCRIPTION

The present invention provides a software-implemented CPU power monitor, and is primarily directed to optimizing power management in battery-powered mobile PCs. The invention is described herein with reference to computer systems operating in a Windows® environment, but may be equally advantageous in other operating environments.

When writing applications to run under Windows®95 using Win32 API (Application Program Interface) services, good programming practice dictates that certain blocking APIs (e.g., GetMessage, WaitMessage) be called to inform the operating system whenever the application is waiting for some message, such as keyboard input, a mouse event, or a timer event. This enables the operating system to "suspend" or "idle" the application until the application actually has a message to handle. More importantly, once all of the applications running on the system are in this suspended state (i.e., waiting for input), the operating system can itself enter an idle state and allow power management to occur.

Figure 1:
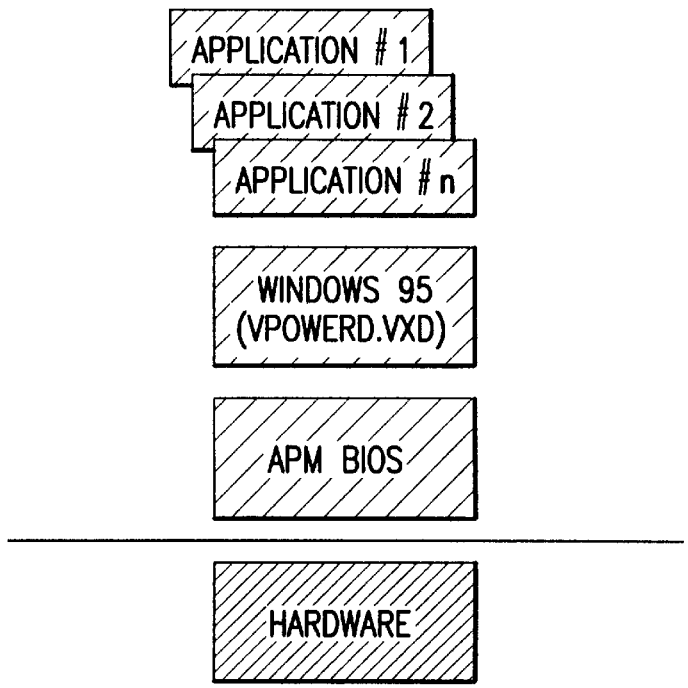
FIG. 1 illustrates the multi-layer power management architecture of the Windows®95 environment.
Figure 2:
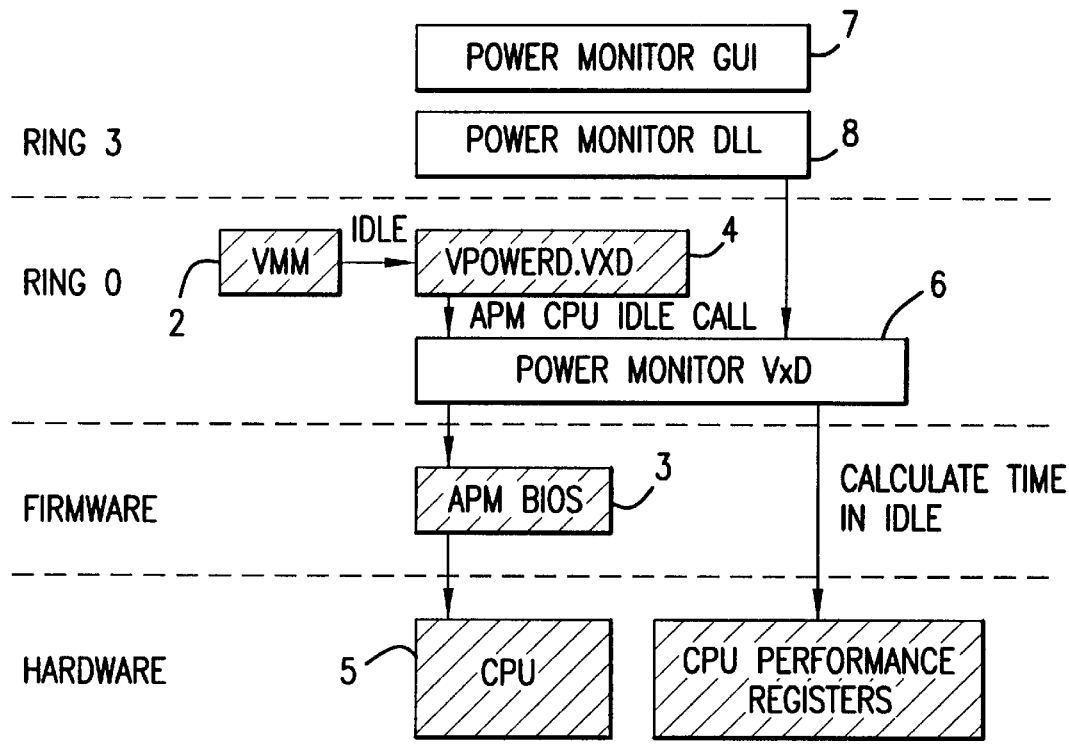
FIG. 2 is a block diagram depicting an embodiment of the present invention for use with a computer system equipped with APM BIOS.

With reference to FIG. 2, in a computer system 1 running Windows®95, for example, once the operating system (not shown) determines that all applications are in an idle state it allows installable device drivers that have previously requested notification of the idle state to perform desired idle-time processing. A device driver makes such a request by calling the operating system's VMM (Virtual Machine Manager) 2 with a Call_When_Idle function code, passing a callback address to the VMM 2. Device drivers are called back in the reverse order in which they invoked the Call_When_Idle function.

When a Windows® operating system is installed on a computer for the first time, Windows® checks whether the computer system 1 contains an APM (Advanced Power Management) BIOS 3. If so, Windows® places into the default load configuration a virtual device driver, or VxD, called VPOWERD 4. A virtual device driver is a 32-bit dynamic-link library (DLL) that manages a system resource, such as a hardware device or installed software, so that more than one application can use the resource at the same time. VPOWERD 4 enables the operating system to communicate with the APM BIOS 3 for power management purposes.

Placing VPOWERD 4 into the default load configuration ensures that it will load every time Windows® is started ("booted"). VPOWERD 4 is given an extremely low load order to ensure that it loads early in the boot process. This allows VPOWERD 4 to be the first device driver to invoke the Call_When_Idle function, which means it will be the last device driver to receive a callback when the system is idle. The order is significant because it allows all other device drivers that requested idle notification to complete their idle-time processing before power management occurs.

In order to communicate with the APM BIOS 3, VPOWERD 4 must first "connect" to the APM BIOS 3. To do this, VPOWERD 4 makes an INT 15 h APM BIOS 32-bit Connect call to determine the location of the 32-bit entry point for the APM BIOS 3. Once this call has been successfully made, VPOWERD 4 constructs a 32-bit code selector for the APM BIOS 3 to execute in, plus 32-bit and 16-bit data selectors for any storage required by the APM BIOS 3. Once all of this initialization is complete, VPOWERD 4 is ready to handle idle notifications from the operating system.

Absent the CPU power monitor of the present invention, when VPOWERD 4 receives an idle callback, it executes the APM BIOS' 3 CPU_Idle call. This allows the APM BIOS to perform several power saving functions, such as executing an HLT command to save power in the CPU 5. The APM BIOS 3 retains control until it receives an external interrupt, such as occurs when a mouse button is depressed. At this point the APM BIOS 3 finishes its task and returns to VPOWERD 4. VPOWERD 4 then performs a CLC (clear carry) command and a return, thereby consuming the idle and returning control back to the Windows® operating system.

In the embodiment of FIG. 2, the power monitor VxD 6 is installed as an intermediary between VPOWERD 4 and the APM BIOS 3. This configuration permits the power monitor VxD 6 to intercept the APM CPU_Idle call when VPOWERD 4 attempts to invoke the power management functions of the APM BIOS 3. The power monitor VxD 6 will invoke the APM BIOS 3 in the same way that VPOWERD 4 would have (i.e., using the APM CPU_Idle call); however, by making the CPU_Idle call (and receiving control when the APM BIOS 3 returns) the power monitor VxD 6 is able to gather useful information relating to the system's power management activities. This information may include, for example, the number of idle calls made over a given period of time, the number of CPU cycles executed during an idle, the length of time spent in an idle state, and the percentage of total time spent in an idle state.

Installing the power monitor VxD 6 between VPOWERD 4 and the APM BIOS 3 requires hooking the power monitor VxD 6 into the idle callback chain such that it is the last device driver to receive a callback. In addition, not only must the power monitor VxD 6 establish a connection to the APM BIOS 3, but it must effectively trick VPOWERD 4 into connecting to the power monitor VxD 6 instead of the APM BIOS 3. This is necessary because the APM BIOS 3 allows only a single device driver to perform a far 32-bit call to its entry point. A preferred method for configuring the power monitor VxD 6 is disclosed in the inventor's co-pending U.S. patent application entitled "Method for Monitoring a BIOS," the specification of which is expressly incorporated herein by reference.

Figure 3:
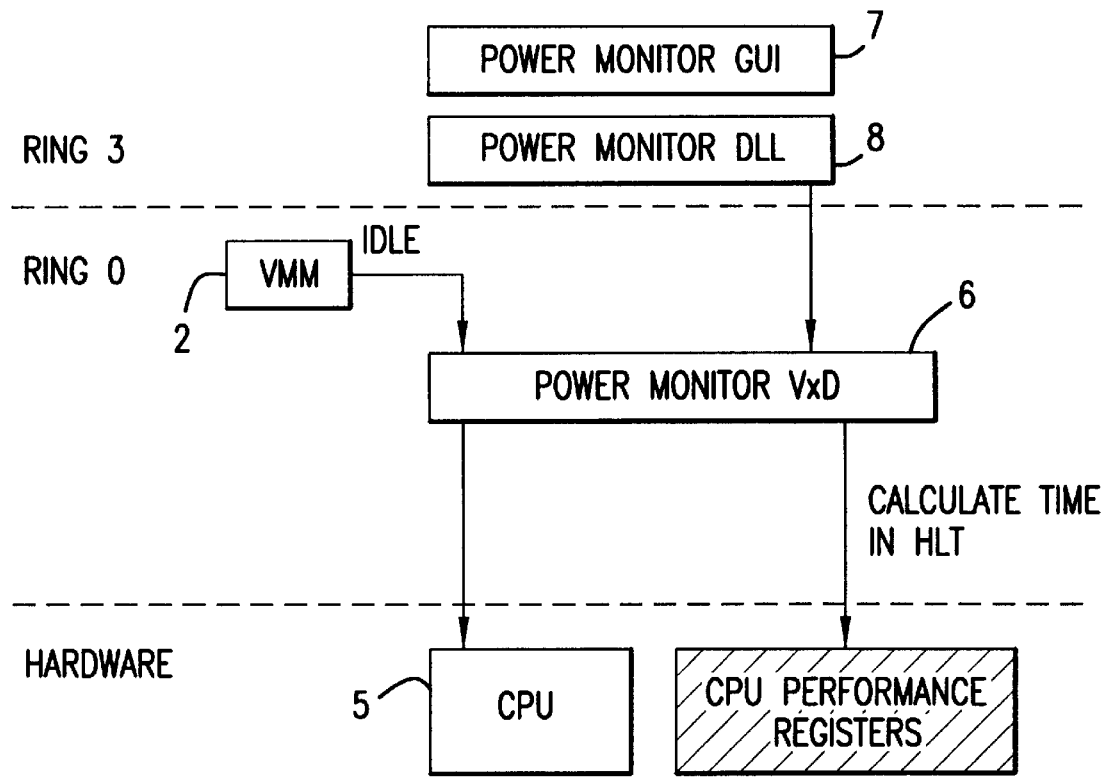
FIG. 3 is a block diagram depicting an embodiment of the present invention for use with a computer system not equipped with APM BIOS.

Referring now to FIG. 3, the present invention may also be used to monitor CPU power usage in a computer system 1' that does not have an APM BIOS. In the absence of the APM BIOS, Windows®95 cannot call the CPU_Idle function. Thus, after the VMM 2 completes processing of the idle callback chain, the operating system does nothing other than return from the idle handler. The CPU 5 continues to run at full speed, with no power savings whatsoever.

Nevertheless, where the CPU 5 supports the HLT instruction, as is the case with Intel's Pentium® family of processors, the power monitor VxD 6' may assume the role of both VPOWERD and the APM BIOS by executing the HLT instruction when the system is idle. The result is that the CPU 5 is placed into a low-power state just as if the APM CPU_Idle function was called in an APM-equipped system. A preferred method by which the power monitor VxD 6' may be configured to perform these power management functions is disclosed in the inventor's co-pending U.S. patent application entitled "CPU Power Management in Systems Without APM," the specification of which is expressly incorporated herein by reference.

As shown in FIG. 2 and FIG. 3, the CPU power monitor of the present invention preferably includes a graphical user interface (GUI) 7 for communicating information concerning CPU power usage to a user. The graphical user interface 7 may be a software routine implemented through a DLL 8.

Figure 4:
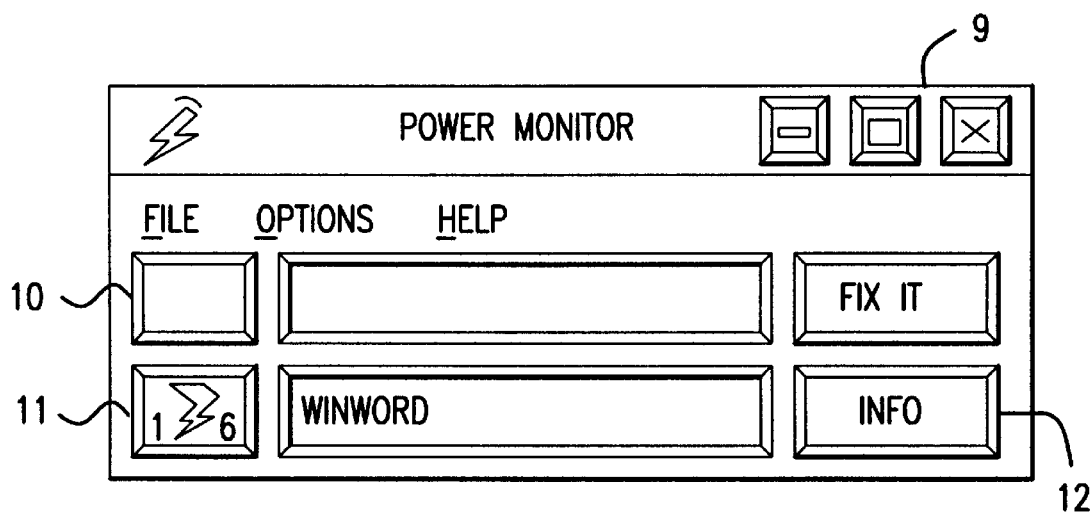
FIG. 4 illustrates a graphical user interface for a CPU power monitor according to the present invention.

In an embodiment illustrated in FIG. 4, the CPU power monitor maintains a dialog panel 9 including a bar graph 10 representing a percentage of time that the CPU is not idle. In order to calculate the amount of time spent in the CPU idle function, the power monitor VxD 6, 6' must know the time before and after the CPU_Idle (or CPU HLT) command is executed. Where the CPU is a Pentium® processor, for example, the power monitor VxD 6, 6' can read the CPU Time Stamp Counter (TSC) before the function call is passed to the APM BIOS (or before the CPU HLT command is executed) and read it again after return from the APM BIOS (or the CPU HLT command). As explained in the Pentium® Pro Family Developer's Manual, Volume 3: Operating System Writer's Manual (1996), the TSC is incremented on every CPU clock cycle and therefore can function as a high-precision timer. Using the TSC, the power monitor VxD 6, 6' can calculate the number of cycles the CPU is idle. Every second, the total number of cycles is read from the TSC. With this information, the idle time can be calculated as a percentage of the sample time.

Figure 5:
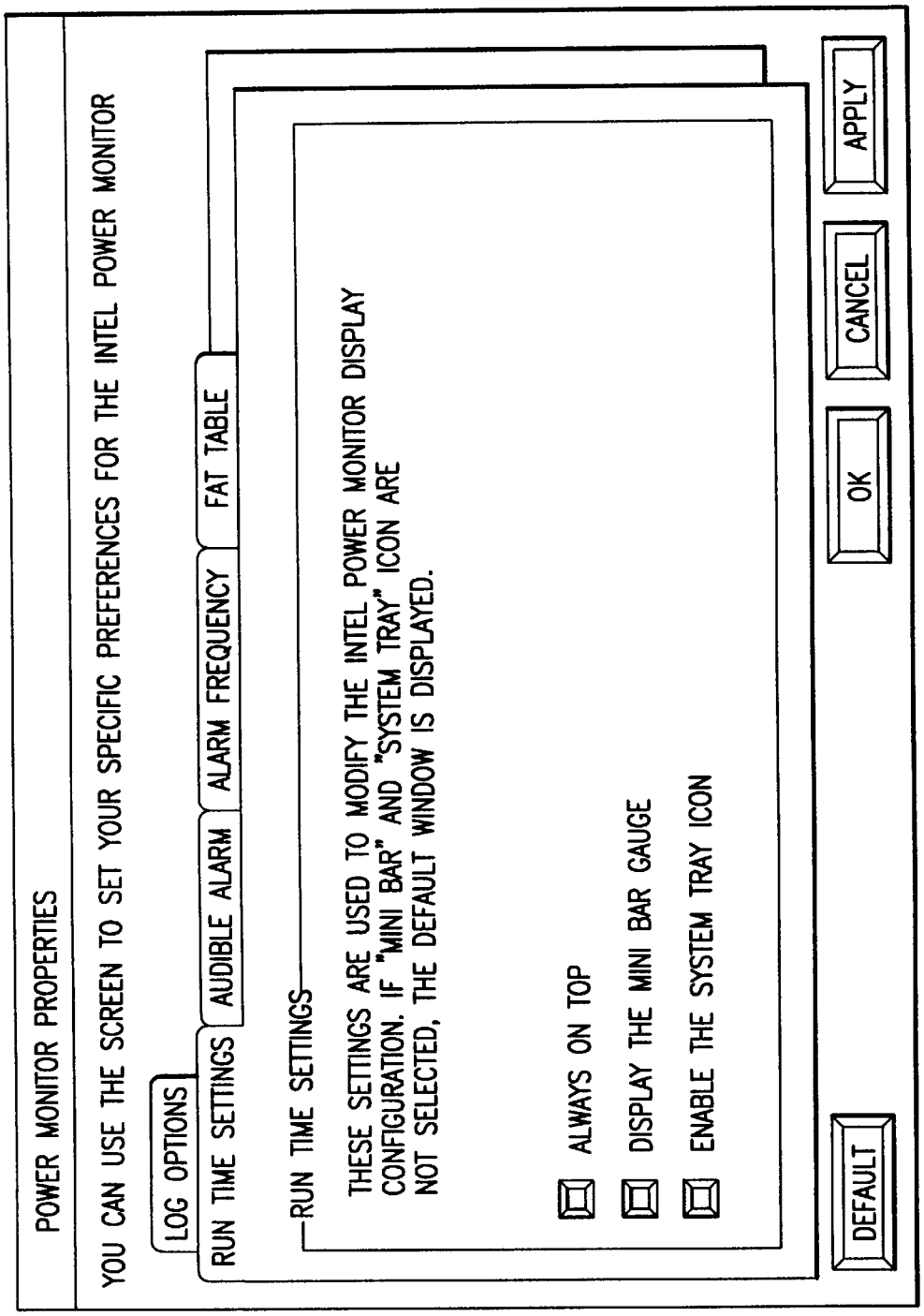
FIG. 5 illustrates a maintenance screen for a CPU power monitor according to the present invention.

The dialog panel 9 also includes a display line 11 showing the name of the most active application, as well as an "info" button 12 which, when pushed, may display additional information about the most active application (e.g., the full command line for the application). The dialog panel 9 may also include one or more pull-down menus providing access to additional features and advanced options. For example, the user may be provided access to a "Properties" dialog panel as illustrated in FIG. 5. This panel could be used, for example, to maintain an alarm that can be set to perform a predetermine action when the system becomes "non-idle," such as generating a sound and/or opening the main dialog panel 9. Other information about CPU power usage may also be presented to a user. The information presented, as well as the format of that presentation, may be varied according to the needs of any particular implementation.

Upon determination that the system is in a non-idle state, the CPU power monitor of the present invention preferably attempts to identify the particular software that is preventing the system from entering idle. According to the present invention, the CPU power monitor can advantageously be configured to detect both application software and virtual device drivers that are blocking idle.

To monitor applications, the power monitor VxD 6, 6' uses the VMM service GetCurrentProcessHandle, which returns the address of the currently-running applications process database. To retrieve the name of the current process from this database, the power monitor VxD 6, 6' first grabs a 2-byte value that is located at hex 38 bytes into the process database. Using this 2-byte value as a selector and hex 0F2 as an offset gives a pointer to an 8-byte process name. This database includes several useful items of information in addition to the process name, such as the command line and process type flags for the process.

With Windows®95, like any preemptive operating system, other applications continue to run. It is therefore conceivable that GetCurrentProcessHandle may incorrectly identify some other application as the offending software. To maximize the possibility of correctly identifying the offender, the power monitor VxD 6, 6' should sample for some period of time to determine the most active application.

Where a system is being prevented from entering an idle state by a VxD not properly handling the idle callback, the offending VxD may be discovered using a different method. According to this alternate embodiment, the power monitor VxD 6, 6' could be configured to take over the VMM's job of calling each of the idle callbacks in their proper order. This allows the power monitor VxD 6, 6' to detect which VxD is terminating the idle callback chain. When the system is not idle and one particular VxD is repeatedly identified as consuming the idle, that VxD may reasonably be assumed to be the offender.

Under certain circumstances, it is possible to "assist" power-wasting software to enter the idle state. This method of fixing ill-behaved applications is effective, for example, when the power monitor VxD 6, 6' identifies the root cause of the problem as either the improper use of the PeekMessage API or a so-called "idle eating" VxD (as described above).

In the case of a PeekMessage problem, the power monitor VxD 6, 6' globally hooks the Win32 PeekMessage API, thereby allowing the power monitor VxD 6, 6' to detect when software is in a PeekMessage loop. The power monitor VxD 6, 6' also calls GetCurrentProcessID from this hook, enabling it to maintain a table of processes that have called PeekMessage, along with the frequency of these calls.

The CPU power monitor software must do several things in order to globally hook the PeekMessage call. First, it must find the address of PeekMessage in the system. To do this, it uses the GetProcAddress Windows® API. Second, it must locate a portion of memory that is allocated by the system, but that is currently unused. This can be done by examining the "file" in memory that contains the PeekMessage call, denoted USER32.DLL. The starting address of this file can be retrieved by calling the GetModuleHandle Windows® API. This file is structured in the Portable Executable (PE) format, as described in Randy Kath, "The Portable Executable File Format from Top to Bottom" (Microsoft Developers Network (MSDN) CD 1996). The USER32.DLL file is divided into sections, with each section beginning on a boundary that is designated by a SectionAlignment field in an IMAGE_OPTIONAL_HEADER structure located near the beginning of the file.

Next, the power monitor VxD 6, 6' must determine if there is unused space at the end of the section of the USER32.DLL file where PeekMessage resides (i.e., the .text section). This can be done by determining the length of the .text section and calculating the amount of memory from the end of the .text section to the beginning of the next section.

Assuming sufficient space exists, the CPU power monitor software will construct some assembler code to place in the unused portion of the .text section. This assembler routine will call GetModuleHandle on a DLL that the CPU power monitor software provides. If the DLL is not loaded, the assembler code must call LoadLibrary on that DLL. If LoadLibrary fails, then the assembler routine jumps to its exit code (described below). Once loading of the DLL is confirmed, the assembler routine calls GetProcAddress on the DLL function that will hook the PeekMessage call (again jumping to the exit code if this call fails). The assembler routine then calls the address returned by GetProcAddress, which will be the location of the PeekMessage handler.

The assembler routine then performs its exit code, which includes an action that will be overwritten by a PeekMessage "hook jump," and a jump back to the next instruction after the PeekMessage hook jump. Finally, the CPU power monitor software must place an instruction at the normal PeekMessage address that jumps to the routine that now resides in the unused portion of the .text section. This completes the hooking process. To later unhook PeekMessage, the original memory at the PeekMessage address must be restored so that no jump will occur, thus allowing normal execution of the PeekMessage routine.

According to this embodiment, the CPU power monitor uses the PeekMessage hook to present a user with an option to fix the offending application when all of the following conditions are met:

the system is non-idle;

a process has called PeekMessage more than a predetermined threshold number of times; and the non-idle process matches the process calling PeekMessage.

If the user elects to fix the application, its process ID is stored in a fix table maintained by the power monitor VxD 6, 6'.

To fix the PeekMessage offender, when a PeekMessage is called the hook routine (a) determines that the calling process is in the fixed list; and (b) calls a blocking Win32 API named MsgWaitForMultipleObjects that forces the process to suspend for a short period of time. The blocking API waits for a message to be placed in the application's message queue or, alternatively, times out. The amount of time that the process is blocked is minimal, typically less than 14 milliseconds. From the application's perspective, it is still using a non-blocking PeekMessage call; however, from the operating system's perspective, a blocking call that allows power management to take place has been made. The power monitor VxD 6, 6' will use MsgWaitForMultipleObjects to block until one of the following conditions is met:

the timeout limit for the call is reached; or a message is available to the calling process.

By comparison, fixing offending VxDs is a straightforward process. As described above, the power monitor VxD 6, 6' takes over the VMM's idle mechanism in order to determine which VxD's are consuming idles. When a fixed VxD attempts to terminate the idle chain, the power monitor VxD 6, 6' immediately calls VPOWERD's 4 idle handler, which in turn calls the CPU_Idle function. If VPOWERD 4 is not loaded, the power monitor VxD 6, 6' will instead directly issue the HLT instruction. In either case, CPU power management is advantageously performed.

The CPU power monitor according to the present invention is capable of fixing several applications at the same time. A table of fixed process IDs can be maintained, with process IDs added and removed as software is fixed and unfixed by the user. Corrective action may be taken each time errant behavior is detected and the offending application/VxD is found in the fix table.

It should be noted that the "fix" feature of the present invention is not intended to provide a permanent fix for power-wasting applications. Rather, it is intended to demonstrate that in some cases an application's power-friendliness can be improved.

As the foregoing description demonstrates, the CPU power monitor of the present invention provides software designers and system users with an easy-to-use yet powerful tool for improving the power-friendliness of software running on computer systems where energy efficiency is a primary concern. Using this tool, it will be possible to identify software that expends energy without providing a concomitant benefit to the user. The ability to detect such wasteful software is highly advantageous given the ever-increasing demands placed on battery-powered computer systems.

What is claimed is:

1. A computer system including a software-implemented tool for monitoring power management, the computer system including a processor capable of selectively operating in a normal mode and a reduced power mode, said software-implemented tool comprising program code to initiate operation of the processor in said reduced power mode when all active software applications on the computer system are in a suspended state, to detect termination of said reduced power mode operation, to monitor activity of the computer system during said reduced power mode operation, and to generate a display of power management information pertaining to said monitored activity.

2. The computer system of claim 1, further comprising an output device and a user interface routine, said user interface routine being coupled to said software-implemented tool and including program code to present said power management information on said output device.

3. The computer system of claim 2, further comprising an input device, said user interface routine further including program code to act upon a user input, received from said input device, relating to said power management information.

4. The computer system of claim 1, further comprising a virtual machine manager controlling one or more virtual device drivers loaded on the computer system, wherein said virtual machine manager sequentially invokes said one or more virtual device drivers using an idle callback interrupt chain, said software-implemented tool further comprising a virtual device driver hooked into said idle callback interrupt chain.

5. An apparatus for monitoring power management in a computer system, the computer system including a processor, an operating system, a memory, an output device, and a virtual machine manager which maintains an idle callback chain comprising a list of addresses corresponding to one or more virtual device drivers to be sequentially called when software loaded on the computer system is in a suspended state, said apparatus comprising:

(a) a monitor virtual device driver including program code to cause the processor to enter a low-power state, wherein an address for said monitor virtual device driver is included in the idle callback chain;

(b) a monitor routine in communication with said monitor virtual device driver, said monitor routine including program code to monitor activity of the computer system while the processor is in the low-power state and to store data pertaining to said monitored activity in the memory; and (c) a user interface routine in communication with said monitor routine, said user interface routine including program code to output said data pertaining to said monitored activity on the output device.

6. The apparatus of claim 5, wherein said computer system further comprises a built-in power management routine invoked by said virtual machine manager using a call propagated through said idle callback interrupt chain, said virtual device driver being configured to intercept said call.

7. The apparatus of claim 6, wherein said monitor virtual device driver includes a false entry point to said built-in power management routine, said false entry point residing at a location in the memory where software running on the computer system would direct a call to said built-in power management routine.

8. The apparatus of claim 5, wherein said data pertaining to said monitored activity comprises a number of CPU cycles executed while the processor is in said low-power state.

9. The apparatus of claim 5, wherein said data pertaining to said monitored activity comprises a period of time that the processor is in said low-power state.

10. A method for monitoring power management in a computer system, wherein the computer system includes a processor capable of selectively operating in a full-power state and a low-power state, said method comprising the steps of:

(a) maintaining an idle callback interrupt chain comprising addresses corresponding to one or more virtual device drivers to be sequentially called when software loaded on the computer system is idle, and hooking a monitor virtual device driver at an end of said idle callback interrupt chain such that said monitor virtual device driver will not be invoked until all other of said one or more virtual device drivers in said idle callback chain have completed idle-time processing;

(b) instructing the processor to enter its low-power state in response to invocation of said monitor virtual device driver;

(c) monitoring activity of the computer system while the processor is in its low-power state; and (d) generating a display of power management information derived from said monitored activity.

11. The method of claim 10, wherein said computer system includes a built-in power management facility invoked through said idle callback chain, said step of detecting a system condition further comprising establishing a false entry point to said built-in power management facility, said false entry point residing at a memory location where software running on the computer system will direct a call to invoke said built-in power management facility.

12. The method of claim 11, wherein said step of instructing the processor to enter its low-power state comprises issuing an idle call to said built-in power management facility.

13. The method of claim 10, wherein said step of instructing the processor to enter its low-power state comprises executing an instruction which causes the processor to enter a halt state.

14. The method of claim 10, wherein said monitoring step comprises maintaining a count of CPU cycles executed while the processor is in its low-power state.

15. The method of claim 10, wherein said monitoring step comprises determining a length of time the processor spent in its low-power state.

16. The method of claim 15, wherein said monitoring step further comprises calculating a percentage of a sample time period the processor spent in its low-power state.

17. The method of claim 10, further comprising the step of identifying a software routine which is preventing the processor from entering its low-power state.

18. The method of claim 17, further comprising the step of dynamically modifying operation of said identified software routine to enable the processor to enter its low-power state.

* * * * *